United States Patent
Ciesla et al.

(10) Patent No.: US 9,372,539 B2
(45) Date of Patent: *Jun. 21, 2016

(54) METHOD FOR ACTUATING A TACTILE INTERFACE LAYER

(71) Applicant: Tactus Technology,, Inc., Fremont, CA (US)

(72) Inventors: Craig Ciesla, Fremont, CA (US); Micah Yairi, Fremont, CA (US); Nathaniel Mark Saal, Fremont, CA (US)

(73) Assignee: Tactus Technology, Inc., Fremont, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 14/242,352

(22) Filed: Apr. 1, 2014

(65) Prior Publication Data

US 2014/0210789 A1 Jul. 31, 2014

Related U.S. Application Data

(63) Continuation of application No. 14/054,591, filed on Oct. 15, 2013, now Pat. No. 8,723,832, which is a continuation of application No. 13/090,208, filed on Apr. 19, 2011, now Pat. No. 8,587,541.

(60) Provisional application No. 61/325,772, filed on Apr. 19, 2010.

(51) Int. Cl.
*G06F 3/041* (2006.01)
*G06F 3/01* (2006.01)
(Continued)

(52) U.S. Cl.
CPC ............ *G06F 3/016* (2013.01); *G06F 3/0202* (2013.01); *G06F 3/044* (2013.01); *G06F 3/0414* (2013.01); *G06F 3/04883* (2013.01); *G06F 3/04886* (2013.01); *G06F 2203/04809* (2013.01)

(58) Field of Classification Search
CPC ....................................................... G06F 3/016
USPC ........................................................... 345/173
See application file for complete search history.

(56) References Cited

U.S. PATENT DOCUMENTS 3,034,628 A  5/1962  Wadey
3,659,354 A  5/1972  Sutherland
(Continued)

FOREIGN PATENT DOCUMENTS

CN  1260525 A  7/2000
CN  1530818 A  9/2004
(Continued)

OTHER PUBLICATIONS

Essilor. "Ophthalmic Optic Files Materials," Essilor International, Ser 145 Paris France, Mar. 1997, pp. 1-29, [retrieved on Nov. 18, 2014]. Retrieved from the internet. URL: <http://www.essiloracademy.eu/sites/default/files/9.Materials.pdf>.
(Continued)

*Primary Examiner* — Travis Hunnings
*Assistant Examiner* — Benyam Haile
(74) *Attorney, Agent, or Firm* — Jeffrey Schox

(57) ABSTRACT

A method for actuating a tactile interface layer for a device that defines a surface with a deformable region, comprising the steps of detecting a gesture of the user along the surface of the tactile interface layer that includes a movement of a finger of the user from a first location on the surface to a second location on the surface; interpreting the gesture as a command for the deformable region; and manipulating the deformable region of the surface based on the command.

22 Claims, 5 Drawing Sheets

(51) Int. Cl.
*G06F 3/044* (2006.01)
*G06F 3/0488* (2013.01)
*G06F 3/02* (2006.01)

(56) References Cited

U.S. PATENT DOCUMENTS

| | | | |
|---|---|---|---|
| 3,759,108 A | 9/1973 | Borom et al. |
| 3,780,236 A | 12/1973 | Gross |
| 3,818,487 A | 6/1974 | Brody et al. |
| 4,109,118 A | 8/1978 | Kley |
| 4,209,819 A | 6/1980 | Seignemartin |
| 4,290,343 A | 9/1981 | Gram |
| 4,307,268 A | 12/1981 | Harper |
| 4,467,321 A | 8/1984 | Volnak |
| 4,477,700 A | 10/1984 | Balash et al. |
| 4,517,421 A | 5/1985 | Margolin |
| 4,543,000 A | 9/1985 | Hasenbalg |
| 4,584,625 A | 4/1986 | Kellogg |
| 4,700,025 A | 10/1987 | Hatayama et al. |
| 4,772,205 A | 9/1988 | Chlumsky et al. |
| 4,920,343 A | 4/1990 | Schwartz |
| 4,940,734 A | 7/1990 | Ley et al. |
| 5,194,852 A | 3/1993 | More et al. |
| 5,195,659 A | 3/1993 | Eiskant |
| 5,212,473 A | 5/1993 | Louis |
| 5,222,895 A | 6/1993 | Fricke |
| 5,286,199 A | 2/1994 | Kipke |
| 5,346,476 A | 9/1994 | Elson |
| 5,369,228 A | 11/1994 | Faust |
| 5,412,189 A | 5/1995 | Cragun |
| 5,459,461 A | 10/1995 | Crowley et al. |
| 5,488,204 A | 1/1996 | Mead et al. |
| 5,496,174 A | 3/1996 | Kim et al. |
| 5,666,112 A | 9/1997 | Crowley et al. |
| 5,717,423 A | 2/1998 | Parker |
| 5,729,222 A | 3/1998 | Iggulden et al. |
| 5,742,241 A | 4/1998 | Crowley et al. |
| 5,754,023 A | 5/1998 | Roston et al. |
| 5,766,013 A | 6/1998 | Vuyk |
| 5,767,839 A | 6/1998 | Rosenberg |
| 5,835,080 A | 11/1998 | Beeteson et al. |
| 5,880,411 A | 3/1999 | Gillespie et al. |
| 5,889,236 A | 3/1999 | Gillespie et al. |
| 5,917,906 A | 6/1999 | Thornton |
| 5,943,043 A | 8/1999 | Furuhata et al. |
| 5,977,867 A | 11/1999 | Blouin |
| 5,982,304 A | 11/1999 | Selker et al. |
| 6,067,116 A | 5/2000 | Yamano et al. |
| 6,154,198 A | 11/2000 | Rosenberg |
| 6,154,201 A | 11/2000 | Levin et al. |
| 6,160,540 A | 12/2000 | Fishkin et al. |
| 6,169,540 B1 | 1/2001 | Rosenberg et al. |
| 6,187,398 B1 | 2/2001 | Eldridge |
| 6,188,391 B1 | 2/2001 | Seely et al. |
| 6,218,966 B1 | 4/2001 | Goodwin et al. |
| 6,243,074 B1 | 6/2001 | Fishkin et al. |
| 6,243,078 B1 | 6/2001 | Rosenberg |
| 6,268,857 B1 | 7/2001 | Fishkin et al. |
| 6,271,828 B1 | 8/2001 | Rosenberg et al. |
| 6,278,441 B1 | 8/2001 | Gouzman et al. |
| 6,300,937 B1 | 10/2001 | Rosenberg |
| 6,310,614 B1 | 10/2001 | Maeda et al. |
| 6,323,846 B1 | 11/2001 | Westerman et al. |
| 6,337,678 B1 | 1/2002 | Fish |
| 6,354,839 B1 | 3/2002 | Schmidt et al. |
| 6,356,259 B1 | 3/2002 | Maeda et al. |
| 6,359,572 B1 | 3/2002 | Vale |
| 6,366,272 B1 | 4/2002 | Rosenberg et al. |
| 6,369,803 B2 | 4/2002 | Brisebois et al. |
| 6,384,743 B1 | 5/2002 | Vanderheiden |
| 6,414,671 B1 | 7/2002 | Gillespie et al. |
| 6,429,846 B2 | 8/2002 | Rosenberg et al. |
| 6,437,771 B1 | 8/2002 | Rosenberg et al. |
| 6,462,294 B2 | 10/2002 | Davidson et al. |
| 6,469,692 B2 | 10/2002 | Rosenberg |
| 6,486,872 B2 | 11/2002 | Rosenberg et al. |
| 6,498,353 B2 | 12/2002 | Nagle et al. |
| 6,501,462 B1 | 12/2002 | Garner |
| 6,509,892 B1 | 1/2003 | Cooper et al. |
| 6,529,183 B1 | 3/2003 | Maclean et al. |
| 6,573,844 B1 | 6/2003 | Venolia et al. |
| 6,636,202 B2 | 10/2003 | Ishmael, Jr. et al. |
| 6,639,581 B1 | 10/2003 | Moore et al. |
| 6,655,788 B1 | 12/2003 | Freeman |
| 6,657,614 B1 | 12/2003 | Ito et al. |
| 6,667,738 B2 | 12/2003 | Murphy |
| 6,681,031 B2 | 1/2004 | Cohen et al. |
| 6,683,627 B1 | 1/2004 | Ullmann et al. |
| 6,686,911 B1 | 2/2004 | Levin et al. |
| 6,697,086 B2 | 2/2004 | Rosenberg et al. |
| 6,700,556 B2 | 3/2004 | Richley et al. |
| 6,703,924 B2 | 3/2004 | Tecu et al. |
| 6,743,021 B2 | 6/2004 | Prince et al. |
| 6,788,295 B1 | 9/2004 | Inkster |
| 6,819,316 B2 | 11/2004 | Schulz et al. |
| 6,850,222 B1 | 2/2005 | Rosenberg |
| 6,861,961 B2 | 3/2005 | Sandbach et al. |
| 6,877,986 B2 | 4/2005 | Fournier et al. |
| 6,881,063 B2 | 4/2005 | Yang |
| 6,930,234 B2 | 8/2005 | Davis |
| 6,937,225 B1 | 8/2005 | Kehlstadt et al. |
| 6,975,305 B2 | 12/2005 | Yamashita |
| 6,979,164 B2 | 12/2005 | Kramer |
| 6,982,696 B1 | 1/2006 | Shahoian |
| 6,995,745 B2 | 2/2006 | Boon et al. |
| 7,027,032 B2 | 4/2006 | Rosenberg et al. |
| 7,056,051 B2 | 6/2006 | Fiffie |
| 7,061,467 B2 | 6/2006 | Rosenberg |
| 7,064,655 B2 | 6/2006 | Murray et al. |
| 7,079,111 B2 | 7/2006 | Ho |
| 7,081,888 B2 | 7/2006 | Cok et al. |
| 7,096,852 B2 | 8/2006 | Gregorio |
| 7,102,541 B2 | 9/2006 | Rosenberg |
| 7,104,152 B2 | 9/2006 | Levin et al. |
| 7,106,305 B2 | 9/2006 | Rosenberg |
| 7,106,313 B2 | 9/2006 | Schena et al. |
| 7,109,967 B2 | 9/2006 | Hioki et al. |
| 7,112,737 B2 | 9/2006 | Ramstein |
| 7,113,166 B1 | 9/2006 | Rosenberg et al. |
| 7,116,317 B2 | 10/2006 | Gregorio et al. |
| 7,124,425 B1 | 10/2006 | Anderson, Jr. et al. |
| 7,129,854 B2 | 10/2006 | Arneson et al. |
| 7,131,073 B2 | 10/2006 | Rosenberg et al. |
| 7,136,045 B2 | 11/2006 | Rosenberg et al. |
| 7,138,977 B2 | 11/2006 | Kinerk et al. |
| 7,138,985 B2 | 11/2006 | Nakajima |
| 7,143,785 B2 | 12/2006 | Maerkl et al. |
| 7,144,616 B1 | 12/2006 | Unger et al. |
| 7,148,875 B2 | 12/2006 | Rosenberg et al. |
| 7,151,432 B2 | 12/2006 | Tierling |
| 7,151,527 B2 | 12/2006 | Culver |
| 7,151,528 B2 | 12/2006 | Taylor et al. |
| 7,154,470 B2 | 12/2006 | Tierling |
| 7,158,112 B2 | 1/2007 | Rosenberg et al. |
| 7,159,008 B1 | 1/2007 | Wies et al. |
| 7,161,276 B2 | 1/2007 | Face |
| 7,161,580 B2 | 1/2007 | Bailey et al. |
| 7,168,042 B2 | 1/2007 | Braun et al. |
| 7,176,903 B2 | 2/2007 | Katsuki et al. |
| 7,182,691 B1 | 2/2007 | Schena |
| 7,191,191 B2 | 3/2007 | Peurach et al. |
| 7,193,607 B2 | 3/2007 | Moore et al. |
| 7,195,170 B2 | 3/2007 | Matsumoto et al. |
| 7,196,688 B2 | 3/2007 | Schena |
| 7,198,137 B2 | 4/2007 | Olien |
| 7,199,790 B2 | 4/2007 | Rosenberg et al. |
| 7,202,851 B2 | 4/2007 | Cunningham et al. |
| 7,205,981 B2 | 4/2007 | Cunningham |
| 7,208,671 B2 | 4/2007 | Chu |
| 7,209,028 B2 | 4/2007 | Boronkay et al. |
| 7,209,113 B2 | 4/2007 | Park |
| 7,209,117 B2 | 4/2007 | Rosenberg et al. |
| 7,209,118 B2 | 4/2007 | Shahoian et al. |
| 7,210,160 B2 | 4/2007 | Anderson, Jr. et al. |

(56) References Cited

U.S. PATENT DOCUMENTS

| | | |
|---|---|---|
| 7,215,326 B2 | 5/2007 | Rosenberg |
| 7,216,671 B2 | 5/2007 | Unger et al. |
| 7,218,310 B2 | 5/2007 | Tierling et al. |
| 7,218,313 B2 | 5/2007 | Marcus et al. |
| 7,233,313 B2 | 6/2007 | Levin et al. |
| 7,233,315 B2 | 6/2007 | Gregorio et al. |
| 7,233,476 B2 | 6/2007 | Goldenberg et al. |
| 7,236,157 B2 | 6/2007 | Schena et al. |
| 7,245,202 B2 | 7/2007 | Levin |
| 7,245,292 B1 | 7/2007 | Custy |
| 7,249,951 B2 | 7/2007 | Bevirt et al. |
| 7,250,128 B2 | 7/2007 | Unger et al. |
| 7,253,803 B2 | 8/2007 | Schena et al. |
| 7,253,807 B2 | 8/2007 | Nakajima |
| 7,265,750 B2 | 9/2007 | Rosenberg |
| 7,280,095 B2 | 10/2007 | Grant |
| 7,283,120 B2 | 10/2007 | Grant |
| 7,283,123 B2 | 10/2007 | Braun et al. |
| 7,283,696 B2 | 10/2007 | Ticknor et al. |
| 7,289,106 B2 | 10/2007 | Bailey et al. |
| 7,289,111 B2 | 10/2007 | Asbill |
| 7,307,619 B2 | 12/2007 | Cunningham et al. |
| 7,308,831 B2 | 12/2007 | Cunningham et al. |
| 7,319,374 B2 | 1/2008 | Shahoian |
| 7,336,260 B2 | 2/2008 | Martin et al. |
| 7,336,266 B2 | 2/2008 | Hayward et al. |
| 7,339,572 B2 | 3/2008 | Schena |
| 7,339,580 B2 | 3/2008 | Westerman et al. |
| 7,342,573 B2 | 3/2008 | Ryynaenen |
| 7,355,595 B2 | 4/2008 | Bathiche et al. |
| 7,369,115 B2 | 5/2008 | Cruz-Hernandez et al. |
| 7,382,357 B2 | 6/2008 | Panotopoulos et al. |
| 7,390,157 B2 | 6/2008 | Kramer |
| 7,391,861 B2 | 6/2008 | Levy |
| 7,397,466 B2 | 7/2008 | Bourdelais et al. |
| 7,403,191 B2 | 7/2008 | Sinclair |
| 7,432,910 B2 | 10/2008 | Shahoian |
| 7,432,911 B2 | 10/2008 | Skarine |
| 7,432,912 B2 | 10/2008 | Cote et al. |
| 7,433,719 B2 | 10/2008 | Dabov |
| 7,471,280 B2 | 12/2008 | Prins |
| 7,489,309 B2 | 2/2009 | Levin et al. |
| 7,511,702 B2 | 3/2009 | Hotelling |
| 7,522,152 B2 | 4/2009 | Olien et al. |
| 7,545,289 B2 | 6/2009 | Mackey et al. |
| 7,548,232 B2 | 6/2009 | Shahoian et al. |
| 7,551,161 B2 | 6/2009 | Mann |
| 7,561,142 B2 | 7/2009 | Shahoian et al. |
| 7,567,232 B2 | 7/2009 | Rosenberg |
| 7,567,243 B2 | 7/2009 | Hayward |
| 7,589,714 B2 | 9/2009 | Funaki |
| 7,592,999 B2 | 9/2009 | Rosenberg et al. |
| 7,605,800 B2 | 10/2009 | Rosenberg |
| 7,609,178 B2 | 10/2009 | Son et al. |
| 7,656,393 B2 | 2/2010 | King et al. |
| 7,659,885 B2 | 2/2010 | Kraus et al. |
| 7,671,837 B2 | 3/2010 | Forsblad et al. |
| 7,679,611 B2 | 3/2010 | Schena |
| 7,679,839 B2 | 3/2010 | Polyakov et al. |
| 7,688,310 B2 | 3/2010 | Rosenberg |
| 7,701,438 B2 | 4/2010 | Chang et al. |
| 7,728,820 B2 | 6/2010 | Rosenberg et al. |
| 7,733,575 B2 | 6/2010 | Heim et al. |
| 7,743,348 B2 | 6/2010 | Robbins et al. |
| 7,755,602 B2 | 7/2010 | Tremblay et al. |
| 7,808,488 B2 | 10/2010 | Martin et al. |
| 7,834,853 B2 | 11/2010 | Finney et al. |
| 7,843,424 B2 | 11/2010 | Rosenberg et al. |
| 7,864,164 B2 | 1/2011 | Cunningham et al. |
| 7,869,589 B2 | 1/2011 | Tuovinen |
| 7,890,257 B2 | 2/2011 | Fyke et al. |
| 7,890,863 B2 | 2/2011 | Grant et al. |
| 7,920,131 B2 | 4/2011 | Westerman |
| 7,924,145 B2 | 4/2011 | Yuk et al. |
| 7,944,435 B2 | 5/2011 | Rosenberg et al. |
| 7,952,498 B2 | 5/2011 | Higa |
| 7,956,770 B2 | 6/2011 | Klinghult et al. |
| 7,973,773 B2 | 7/2011 | Pryor |
| 7,978,181 B2 | 7/2011 | Westerman |
| 7,978,183 B2 | 7/2011 | Rosenberg et al. |
| 7,978,186 B2 | 7/2011 | Vassallo et al. |
| 7,979,797 B2 | 7/2011 | Schena |
| 7,982,720 B2 | 7/2011 | Rosenberg et al. |
| 7,986,303 B2 | 7/2011 | Braun et al. |
| 7,986,306 B2 | 7/2011 | Eich et al. |
| 7,989,181 B2 | 8/2011 | Blattner et al. |
| 7,999,660 B2 | 8/2011 | Cybart et al. |
| 8,002,089 B2 | 8/2011 | Jasso et al. |
| 8,004,492 B2 | 8/2011 | Kramer et al. |
| 8,013,843 B2 | 9/2011 | Pryor |
| 8,020,095 B2 | 9/2011 | Braun et al. |
| 8,022,933 B2 | 9/2011 | Hardacker et al. |
| 8,031,181 B2 | 10/2011 | Rosenberg et al. |
| 8,044,826 B2 | 10/2011 | Yoo |
| 8,047,849 B2 | 11/2011 | Ahn et al. |
| 8,049,734 B2 | 11/2011 | Rosenberg et al. |
| 8,059,104 B2 | 11/2011 | Shahoian et al. |
| 8,059,105 B2 | 11/2011 | Rosenberg et al. |
| 8,063,892 B2 | 11/2011 | Shahoian et al. |
| 8,063,893 B2 | 11/2011 | Rosenberg et al. |
| 8,068,605 B2 | 11/2011 | Holmberg |
| 8,077,154 B2 | 12/2011 | Emig et al. |
| 8,077,440 B2 | 12/2011 | Krabbenborg et al. |
| 8,077,941 B2 | 12/2011 | Assmann |
| 8,094,121 B2 | 1/2012 | Obermeyer et al. |
| 8,094,806 B2 | 1/2012 | Levy |
| 8,103,472 B2 | 1/2012 | Braun et al. |
| 8,106,787 B2 | 1/2012 | Nurmi |
| 8,115,745 B2 | 2/2012 | Gray |
| 8,123,660 B2 | 2/2012 | Kruse et al. |
| 8,125,347 B2 | 2/2012 | Fahn |
| 8,125,461 B2 | 2/2012 | Weber et al. |
| 8,130,202 B2 | 3/2012 | Levine et al. |
| 8,144,129 B2 | 3/2012 | Hotelling et al. |
| 8,144,271 B2 | 3/2012 | Han |
| 8,154,512 B2 | 4/2012 | Olien et al. |
| 8,154,527 B2 | 4/2012 | Ciesla et al. |
| 8,159,461 B2 | 4/2012 | Martin et al. |
| 8,162,009 B2 | 4/2012 | Chaffee |
| 8,164,573 B2 | 4/2012 | Dacosta et al. |
| 8,166,649 B2 | 5/2012 | Moore |
| 8,169,306 B2 | 5/2012 | Schmidt et al. |
| 8,169,402 B2 | 5/2012 | Shahoian et al. |
| 8,174,372 B2 | 5/2012 | Da Costa |
| 8,174,495 B2 | 5/2012 | Takashima et al. |
| 8,174,508 B2 | 5/2012 | Sinclair et al. |
| 8,174,511 B2 | 5/2012 | Takenaka et al. |
| 8,178,808 B2 | 5/2012 | Strittmatter |
| 8,179,375 B2 | 5/2012 | Ciesla et al. |
| 8,179,377 B2 | 5/2012 | Ciesla et al. |
| 8,188,989 B2 | 5/2012 | Levin et al. |
| 8,195,243 B2 | 6/2012 | Kim et al. |
| 8,199,107 B2 | 6/2012 | Xu et al. |
| 8,199,124 B2 | 6/2012 | Ciesla et al. |
| 8,203,094 B2 | 6/2012 | Mittleman et al. |
| 8,203,537 B2 | 6/2012 | Tanabe et al. |
| 8,207,950 B2 | 6/2012 | Ciesla et al. |
| 8,212,772 B2 | 7/2012 | Shahoian |
| 8,217,903 B2 | 7/2012 | Ma et al. |
| 8,217,904 B2 | 7/2012 | Kim |
| 8,223,278 B2 | 7/2012 | Kim et al. |
| 8,224,392 B2 | 7/2012 | Kim et al. |
| 8,228,305 B2 | 7/2012 | Pryor |
| 8,232,976 B2 | 7/2012 | Yun et al. |
| 8,243,038 B2 | 8/2012 | Ciesla et al. |
| 8,253,052 B2 | 8/2012 | Chen |
| 8,253,703 B2 | 8/2012 | Eldering |
| 8,279,172 B2 | 10/2012 | Braun et al. |
| 8,279,193 B1 | 10/2012 | Birnbaum et al. |
| 8,310,458 B2 | 11/2012 | Faubert et al. |
| 8,345,013 B2 | 1/2013 | Heubel et al. |
| 8,350,820 B2 | 1/2013 | Deslippe et al. |
| 8,362,882 B2 | 1/2013 | Heubel et al. |
| 8,363,008 B2 | 1/2013 | Ryu et al. |

(56) References Cited

U.S. PATENT DOCUMENTS

| | | |
|---|---|---|
| 8,367,957 B2 | 2/2013 | Strittmatter |
| 8,368,641 B2 | 2/2013 | Tremblay et al. |
| 8,378,797 B2 | 2/2013 | Pance et al. |
| 8,384,680 B2 | 2/2013 | Paleczny et al. |
| 8,390,594 B2 | 3/2013 | Modarres et al. |
| 8,395,587 B2 | 3/2013 | Cauwels et al. |
| 8,395,591 B2 | 3/2013 | Kruglick |
| 8,400,402 B2 | 3/2013 | Son |
| 8,400,410 B2 | 3/2013 | Taylor et al. |
| 8,547,339 B2 | 10/2013 | Ciesla |
| 8,587,541 B2 | 11/2013 | Ciesla et al. |
| 8,587,548 B2 | 11/2013 | Ciesla et al. |
| 8,749,489 B2 | 6/2014 | Ito et al. |
| 8,856,679 B2 | 10/2014 | Sirpal et al. |
| 2001/0008396 A1 | 7/2001 | Komata |
| 2001/0043189 A1 | 11/2001 | Brisebois et al. |
| 2002/0063694 A1 | 5/2002 | Keely et al. |
| 2002/0104691 A1 | 8/2002 | Kent et al. |
| 2002/0106614 A1 | 8/2002 | Prince et al. |
| 2002/0110237 A1 | 8/2002 | Krishnan |
| 2002/0149570 A1 | 10/2002 | Knowles et al. |
| 2002/0180620 A1 | 12/2002 | Gettemy et al. |
| 2003/0087698 A1 | 5/2003 | Nishiumi et al. |
| 2003/0117371 A1 | 6/2003 | Roberts et al. |
| 2003/0179190 A1 | 9/2003 | Franzen |
| 2003/0206153 A1 | 11/2003 | Murphy |
| 2003/0223799 A1 | 12/2003 | Pihlaja |
| 2004/0001589 A1 | 1/2004 | Mueller et al. |
| 2004/0056876 A1 | 3/2004 | Nakajima |
| 2004/0056877 A1 | 3/2004 | Nakajima |
| 2004/0106360 A1 | 6/2004 | Farmer et al. |
| 2004/0114324 A1 | 6/2004 | Kusaka et al. |
| 2004/0164968 A1 | 8/2004 | Miyamoto |
| 2004/0178006 A1 | 9/2004 | Cok |
| 2005/0007339 A1 | 1/2005 | Sato |
| 2005/0007349 A1 | 1/2005 | Vakil et al. |
| 2005/0020325 A1 | 1/2005 | Enger et al. |
| 2005/0030292 A1 | 2/2005 | Diederiks |
| 2005/0057528 A1 | 3/2005 | Kleen |
| 2005/0073506 A1 | 4/2005 | Durso |
| 2005/0088417 A1 | 4/2005 | Mulligan |
| 2005/0110768 A1 | 5/2005 | Marriott et al. |
| 2005/0162408 A1 | 7/2005 | Martchovsky |
| 2005/0212773 A1 | 9/2005 | Asbill |
| 2005/0231489 A1 | 10/2005 | Ladouceur et al. |
| 2005/0253816 A1 | 11/2005 | Himberg et al. |
| 2005/0270444 A1 | 12/2005 | Miller et al. |
| 2005/0285846 A1 | 12/2005 | Funaki |
| 2006/0026521 A1 | 2/2006 | Hotelling et al. |
| 2006/0087479 A1 | 4/2006 | Sakurai et al. |
| 2006/0097991 A1 | 5/2006 | Hotelling et al. |
| 2006/0098148 A1 | 5/2006 | Kobayashi et al. |
| 2006/0118610 A1 | 6/2006 | Pihlaja et al. |
| 2006/0119586 A1 | 6/2006 | Grant et al. |
| 2006/0152474 A1 | 7/2006 | Saito et al. |
| 2006/0154216 A1 | 7/2006 | Hafez et al. |
| 2006/0197753 A1 | 9/2006 | Hotelling |
| 2006/0214923 A1 | 9/2006 | Chiu et al. |
| 2006/0238495 A1 | 10/2006 | Davis |
| 2006/0238510 A1 | 10/2006 | Panotopoulos et al. |
| 2006/0238517 A1 | 10/2006 | King et al. |
| 2006/0256075 A1 | 11/2006 | Anastas et al. |
| 2006/0278444 A1 | 12/2006 | Binstead |
| 2007/0013662 A1 | 1/2007 | Fauth |
| 2007/0036492 A1 | 2/2007 | Lee |
| 2007/0085837 A1 | 4/2007 | Ricks et al. |
| 2007/0108032 A1 | 5/2007 | Matsumoto et al. |
| 2007/0122314 A1 | 5/2007 | Strand et al. |
| 2007/0130212 A1 | 6/2007 | Peurach et al. |
| 2007/0152983 A1 | 7/2007 | Mckillop et al. |
| 2007/0165004 A1 | 7/2007 | Seelhammer et al. |
| 2007/0171210 A1 | 7/2007 | Chaudhri et al. |
| 2007/0182718 A1 | 8/2007 | Schoener et al. |
| 2007/0229233 A1 | 10/2007 | Dort |
| 2007/0229464 A1 | 10/2007 | Hotelling et al. |
| 2007/0236466 A1 | 10/2007 | Hotelling |
| 2007/0236469 A1 | 10/2007 | Woolley et al. |
| 2007/0247429 A1 | 10/2007 | Westerman |
| 2007/0254411 A1 | 11/2007 | Uhland et al. |
| 2007/0257634 A1 | 11/2007 | Leschin et al. |
| 2007/0273561 A1 | 11/2007 | Philipp |
| 2007/0296702 A1 | 12/2007 | Strawn et al. |
| 2007/0296709 A1 | 12/2007 | Guanghai |
| 2008/0010593 A1 | 1/2008 | Uusitalo et al. |
| 2008/0024459 A1 | 1/2008 | Poupyrev et al. |
| 2008/0054875 A1 | 3/2008 | Saito |
| 2008/0062151 A1 | 3/2008 | Kent |
| 2008/0136791 A1 | 6/2008 | Nissar |
| 2008/0138774 A1 | 6/2008 | Ahn et al. |
| 2008/0143693 A1 | 6/2008 | Schena |
| 2008/0150911 A1 | 6/2008 | Harrison |
| 2008/0165139 A1 | 7/2008 | Hotelling et al. |
| 2008/0174570 A1 | 7/2008 | Jobs et al. |
| 2008/0202251 A1 | 8/2008 | Serban et al. |
| 2008/0238448 A1 | 10/2008 | Moore et al. |
| 2008/0248836 A1 | 10/2008 | Caine |
| 2008/0251368 A1 | 10/2008 | Holmberg et al. |
| 2008/0252607 A1 | 10/2008 | De Jong et al. |
| 2008/0266264 A1 | 10/2008 | Lipponen et al. |
| 2008/0286447 A1 | 11/2008 | Alden et al. |
| 2008/0291169 A1 | 11/2008 | Brenner et al. |
| 2008/0297475 A1 | 12/2008 | Woolf et al. |
| 2008/0303796 A1 | 12/2008 | Fyke |
| 2009/0002140 A1 | 1/2009 | Higa |
| 2009/0002205 A1 | 1/2009 | Klinghult et al. |
| 2009/0002328 A1 | 1/2009 | Ullrich et al. |
| 2009/0002337 A1 | 1/2009 | Chang |
| 2009/0009480 A1 | 1/2009 | Heringslack |
| 2009/0015547 A1 | 1/2009 | Franz et al. |
| 2009/0028824 A1 | 1/2009 | Chiang et al. |
| 2009/0033617 A1 | 2/2009 | Lindberg et al. |
| 2009/0059495 A1 | 3/2009 | Matsuoka |
| 2009/0066672 A1 | 3/2009 | Tanabe et al. |
| 2009/0085878 A1 | 4/2009 | Heubel et al. |
| 2009/0106655 A1 | 4/2009 | Grant et al. |
| 2009/0115733 A1 | 5/2009 | Ma et al. |
| 2009/0115734 A1 | 5/2009 | Fredriksson et al. |
| 2009/0128376 A1 | 5/2009 | Caine et al. |
| 2009/0128503 A1 | 5/2009 | Grant et al. |
| 2009/0129021 A1 | 5/2009 | Dunn |
| 2009/0132093 A1 | 5/2009 | Arneson et al. |
| 2009/0135145 A1 | 5/2009 | Chen et al. |
| 2009/0140989 A1 | 6/2009 | Ahlgren |
| 2009/0160813 A1 | 6/2009 | Takashima et al. |
| 2009/0167508 A1 | 7/2009 | Fadell et al. |
| 2009/0167509 A1 | 7/2009 | Fadell et al. |
| 2009/0167567 A1 | 7/2009 | Halperin et al. |
| 2009/0167677 A1 | 7/2009 | Kruse et al. |
| 2009/0167704 A1 | 7/2009 | Terlizzi et al. |
| 2009/0174673 A1 | 7/2009 | Ciesla |
| 2009/0174687 A1 | 7/2009 | Ciesla et al. |
| 2009/0181724 A1 | 7/2009 | Pettersson |
| 2009/0182501 A1 | 7/2009 | Fyke et al. |
| 2009/0195512 A1 | 8/2009 | Pettersson |
| 2009/0207148 A1 | 8/2009 | Sugimoto et al. |
| 2009/0215500 A1 | 8/2009 | You et al. |
| 2009/0231305 A1 | 9/2009 | Hotelling et al. |
| 2009/0243998 A1 | 10/2009 | Wang |
| 2009/0250267 A1 | 10/2009 | Heubel et al. |
| 2009/0289922 A1 | 11/2009 | Henry |
| 2009/0303022 A1 | 12/2009 | Griffin et al. |
| 2009/0309616 A1 | 12/2009 | Klinghult |
| 2010/0043189 A1 | 2/2010 | Fukano |
| 2010/0045613 A1 | 2/2010 | Wu et al. |
| 2010/0073241 A1 | 3/2010 | Ayala et al. |
| 2010/0078231 A1 | 4/2010 | Yeh et al. |
| 2010/0079404 A1 | 4/2010 | Degner et al. |
| 2010/0097323 A1 | 4/2010 | Edwards et al. |
| 2010/0103116 A1 | 4/2010 | Leung et al. |
| 2010/0103137 A1 | 4/2010 | Ciesla et al. |
| 2010/0109486 A1 | 5/2010 | Polyakov et al. |
| 2010/0121928 A1 | 5/2010 | Leonard |
| 2010/0141608 A1 | 6/2010 | Huang et al. |
| 2010/0142516 A1 | 6/2010 | Lawson et al. |

(56) References Cited

U.S. PATENT DOCUMENTS

| | | |
|---|---|---|
| 2010/0162109 A1 | 6/2010 | Chatterjee et al. |
| 2010/0171719 A1 | 7/2010 | Craig et al. |
| 2010/0171720 A1 | 7/2010 | Craig et al. |
| 2010/0177050 A1 | 7/2010 | Heubel et al. |
| 2010/0182245 A1 | 7/2010 | Edwards et al. |
| 2010/0232107 A1 | 9/2010 | Dunn |
| 2010/0237043 A1 | 9/2010 | Garlough |
| 2010/0295820 A1 | 11/2010 | Kikin-Gil |
| 2010/0296248 A1 | 11/2010 | Campbell et al. |
| 2010/0298032 A1 | 11/2010 | Lee et al. |
| 2010/0302199 A1 | 12/2010 | Taylor et al. |
| 2010/0321335 A1 | 12/2010 | Lim et al. |
| 2011/0001613 A1 | 1/2011 | Ciesla et al. |
| 2011/0011650 A1 | 1/2011 | Klinghult |
| 2011/0012851 A1 | 1/2011 | Ciesla et al. |
| 2011/0018813 A1 | 1/2011 | Kruglick |
| 2011/0029862 A1 | 2/2011 | Scott et al. |
| 2011/0043457 A1 | 2/2011 | Oliver et al. |
| 2011/0060998 A1 | 3/2011 | Schwartz et al. |
| 2011/0074691 A1 | 3/2011 | Causey et al. |
| 2011/0120784 A1 | 5/2011 | Osoinach et al. |
| 2011/0148793 A1 | 6/2011 | Ciesla et al. |
| 2011/0148807 A1 | 6/2011 | Fryer |
| 2011/0157056 A1 | 6/2011 | Karpfinger |
| 2011/0157080 A1 | 6/2011 | Ciesla et al. |
| 2011/0163978 A1 | 7/2011 | Park et al. |
| 2011/0175838 A1 | 7/2011 | Higa |
| 2011/0175844 A1 | 7/2011 | Berggren |
| 2011/0181530 A1 | 7/2011 | Park et al. |
| 2011/0193787 A1 | 8/2011 | Morishige et al. |
| 2011/0194230 A1 | 8/2011 | Hart et al. |
| 2011/0241442 A1 | 10/2011 | Mittleman et al. |
| 2011/0254672 A1 | 10/2011 | Ciesla et al. |
| 2011/0254709 A1 | 10/2011 | Ciesla et al. |
| 2011/0254789 A1 | 10/2011 | Ciesla et al. |
| 2012/0032886 A1 | 2/2012 | Ciesla et al. |
| 2012/0038583 A1 | 2/2012 | Westhues et al. |
| 2012/0043191 A1 | 2/2012 | Kessler et al. |
| 2012/0056846 A1 | 3/2012 | Zaliva |
| 2012/0062483 A1 | 3/2012 | Ciesla et al. |
| 2012/0080302 A1 | 4/2012 | Kim et al. |
| 2012/0098789 A1 | 4/2012 | Ciesla et al. |
| 2012/0105333 A1 | 5/2012 | Maschmeyer et al. |
| 2012/0120357 A1 | 5/2012 | Jiroku |
| 2012/0154324 A1 | 6/2012 | Wright et al. |
| 2012/0193211 A1 | 8/2012 | Ciesla et al. |
| 2012/0200528 A1 | 8/2012 | Ciesla et al. |
| 2012/0200529 A1 | 8/2012 | Ciesla et al. |
| 2012/0206364 A1 | 8/2012 | Ciesla et al. |
| 2012/0218213 A1 | 8/2012 | Ciesla et al. |
| 2012/0218214 A1 | 8/2012 | Ciesla et al. |
| 2012/0223914 A1 | 9/2012 | Ciesla et al. |
| 2012/0235935 A1 | 9/2012 | Ciesla et al. |
| 2012/0242607 A1 | 9/2012 | Ciesla et al. |
| 2012/0306787 A1 | 12/2012 | Ciesla et al. |
| 2013/0019207 A1 | 1/2013 | Rothkopf et al. |
| 2013/0127790 A1 | 5/2013 | Wassvik |
| 2013/0141118 A1 | 6/2013 | Guard |
| 2013/0215035 A1 | 8/2013 | Guard |
| 2013/0275888 A1 | 10/2013 | Williamson et al. |
| 2014/0043291 A1 | 2/2014 | Ciesla et al. |
| 2014/0160044 A1 | 6/2014 | Yairi et al. |
| 2014/0160063 A1 | 6/2014 | Yairi et al. |
| 2014/0160064 A1 | 6/2014 | Yairi et al. |
| 2014/0176489 A1 | 6/2014 | Park |
| 2015/0009150 A1 | 1/2015 | Cho et al. |
| 2015/0091834 A1 | 4/2015 | Johnson |
| 2015/0205419 A1 | 7/2015 | Calub et al. |

FOREIGN PATENT DOCUMENTS

| | | |
|---|---|---|
| CN | 1882460 A | 12/2006 |
| EP | 2000884 A1 | 12/2008 |
| JP | 10255106 | 9/1998 |
| JP | H10255106 | 9/1998 |
| JP | 2006268068 A | 10/2006 |
| JP | 2006285785 A | 10/2006 |
| JP | 2009064357 A | 3/2009 |
| KR | 20000010511 | 2/2000 |
| KR | 100677624 B | 1/2007 |
| WO | 2004028955 A | 4/2004 |
| WO | 2006082020 A1 | 8/2006 |
| WO | 2008037275 A | 4/2008 |
| WO | 2009002605 A | 12/2008 |
| WO | 2009044027 A2 | 4/2009 |
| WO | 2009067572 A2 | 5/2009 |
| WO | 2009088985 A | 7/2009 |
| WO | 2010077382 A | 7/2010 |
| WO | 2010078596 A | 7/2010 |
| WO | 2010078597 A | 7/2010 |
| WO | 2011003113 A | 1/2011 |
| WO | 2011087816 A | 7/2011 |
| WO | 2011087817 A | 7/2011 |
| WO | 2011112984 A | 9/2011 |
| WO | 2011133604 A | 10/2011 |
| WO | 2011133605 A | 10/2011 |

OTHER PUBLICATIONS

Lind. "Two Decades of Negative Thermal Expansion Research: Where Do We Stand?" Department of Chemistry, the University of Toledo, Materials 2012, 5, 1125-1154; doi:10.3390/ma5061125, Jun. 20, 2012 pp. 1125-1154, [retrieved on Nov. 18, 2014]. Retrieved from the internet. URL: <https://www.google.com/webhp?sourceid=chrome-instant&ion=1&espv=2&ie=UTF-8#q=materials-05-01125.pdf>.

"Sharp Develops and Will Mass Produce New System LCD with Embedded Optical Sensors to Provide Input Capabilities Including Touch Screen and Scanner Functions," Sharp Press Release, Aug. 31, 2007, 3 pages, downloaded from the Internet at: http://sharp-world.com/corporate/news/070831.html.

Jeong et al., "Tunable Microdoublet Lens Array," Optical Society of America, Optics Express; vol. 12, No. 11. May 31, 2004, 7 Pages.

Preumont, A. Vibration Control of Active Structures: An Introduction, Jul. 2011.

METHOD FOR ACTUATING A TACTILE INTERFACE LAYER

CROSS-REFERENCE TO RELATED APPLICATIONS

This application is a continuation of U.S. patent application Ser. No. 14/054,591, filed on 15, Oct. 2013, which is a continuation of U.S. patent application Ser. No. 13/090,208, filed on 19 Apr. 2011 and issued as U.S. Pat. No. 8,587,541 on 19 Nov. 2013, which claims priority to U.S. Provisional Application No. 61/325,772, filed on 19 Apr. 2010, all of which are incorporated in their entireties by this reference.

This application is related to U.S. patent application Ser. No. 11/969,848 filed on 4 Jan. 2008, U.S. patent application Ser. No. 12/319,334 filed on 5, Jan. 2009, and U.S. patent application Ser. No. 12/497,622 filed on 3 Jul. 2009, all of which are incorporated in their entireties by this reference.

TECHNICAL FIELD

This invention relates generally to tactile user interfaces, and more specifically to a new and useful mountable systems and methods for selectively raising portions of a surface of the user interface of a device.

BACKGROUND

As more devices utilize touch screen technology that does not provide physical buttons to a user, tactile interface layers that include deformable regions that function to provide tactile guidance and/or feedback to a user for a device become useful in bridging the need for the flexibility of a touch screen and the desire for tactile guidance in using the device. Such tactile interface layers (for example, the type described in U.S. application Ser. Nos. 11/969,848, 12/319,334, and 12/497,622) introduce a substantially different type of user experience from what is available in the field. Actuation of such tactile interface layers is substantially different from existing keypads seen in the field. This invention provides a new and useful method for interpreting gestures as commands for a tactile interface layer with a deformable region.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
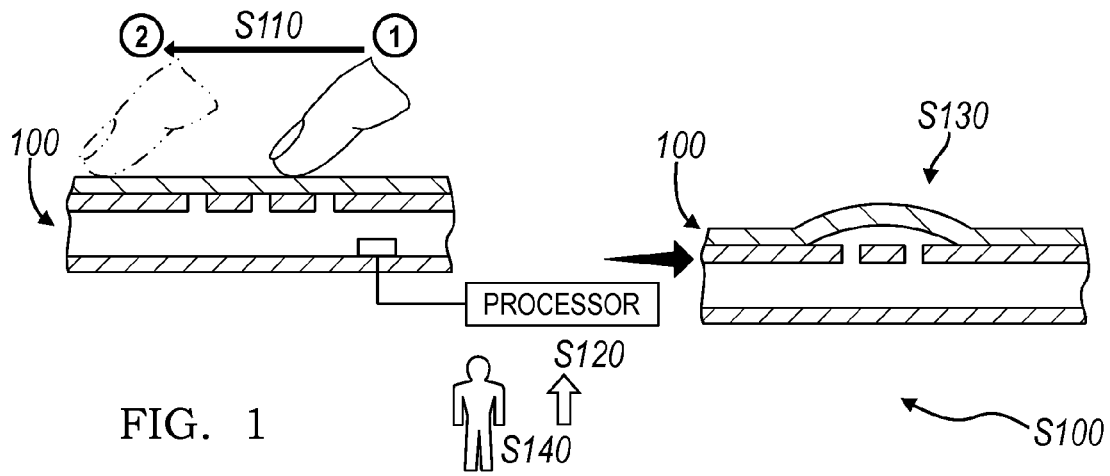
FIG. 1 is a schematic representation of the method of the preferred embodiments.

As shown in FIG. 1, the method S100 for actuating a tactile interface layer 100 of a device that defines a surface with a deformable region of the preferred embodiments includes: detecting a gesture of the user along the surface of the tactile interface layer that includes a movement of a finger of the user from a first location (1) to a second location (2) on the surface Step S110; interpreting the gesture as a command for the deformable region Step S120; and manipulating the deformable region of the surface based on the command Step S130. The method S100 for actuating a tactile interface layer 100 may also include the step of receiving a user input for a particular interpretation of a gesture as a command Step S140. The step of receiving a user input for a particular interpretation of a gesture as a command Step S140 may include receiving a user input from the user of the device, but may alternatively include receiving a user input from a person remote from the device, for example, a third party such as the manufacturer or a second user. However, the user input for a particular interpretation of a gesture as a command may be received from any other suitable user. The method S100 is preferably applied to a tactile interface layer 100 that is to be used with an electronic device and, more preferably, in an electronic device that benefits from an adaptive user interface. The electronic device may include a display and may include a touch sensor. For example, the electronic device may be an automotive console, a steering wheel, a desktop computer, a laptop computer, a tablet computer, a television, a radio, a desk phone, a mobile phone, a PDA, a personal navigation device, a personal media player, a camera, a watch, a remote control, a mouse, a trackpad, or a keyboard. The tactile interface layer 100 may, however, be used as the user interface for any suitable device that interfaces with a user in a tactile and/or visual manner. The tactile interface layer 100 is preferably integrated with the device, for example, in the variation wherein the tactile interface layer 100 includes a sensor 140, the tactile interface layer 100 is preferably assembled into the device and presented to the user as one unit. Alternatively, the tactile interface layer 100 may function as an accessory to a device, the user may be presented the tactile interface layer 100 and the device as two separate units wherein, when coupled to each other, the tactile interface layer 100 functions to provide tactile guidance to the user and/or to receive user inputs. However, the method S100 may be applied to any other suitable arrangement of the tactile interface layer 100.

Figure 2:
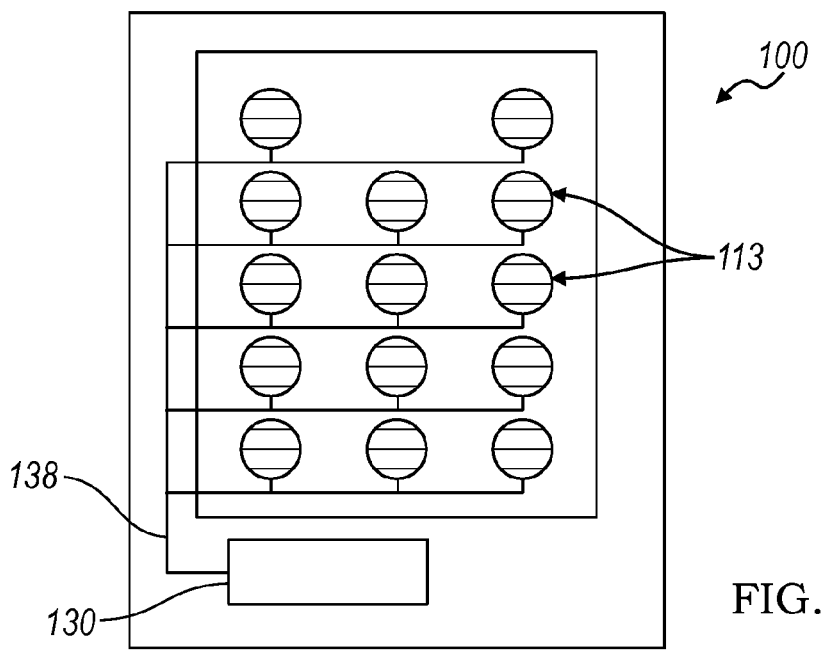
FIG. 2 is a top view of a variation of the tactile interface layer.
Figure 3:
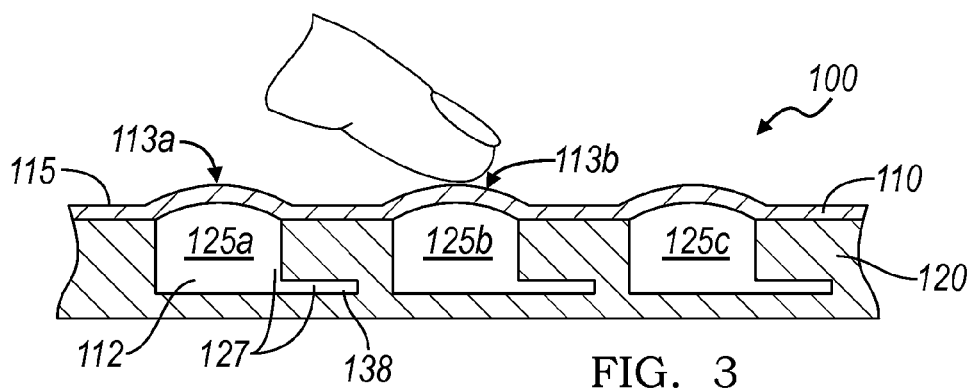
FIG. 3 is a cross sectional view of a variation of the tactile interface layer.
Figure 4A:
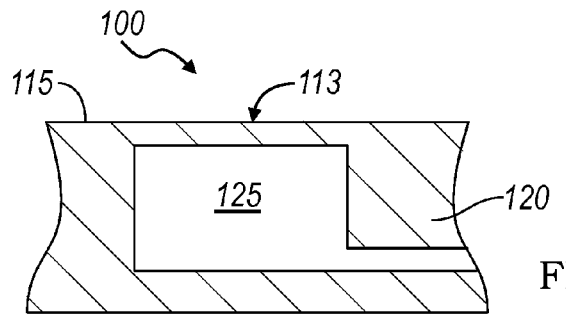
FIGS. 4A, 4B, and 4C are cross-sectional views illustrating the operation of a deformable region of a tactile interface layer.
Figure 4B:
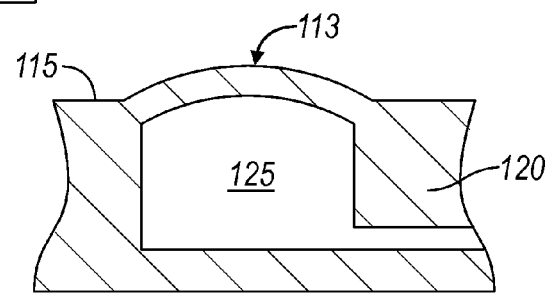
Figure 4C:
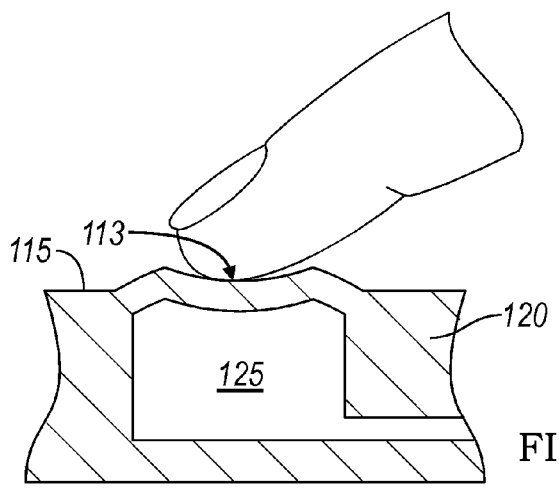
Figure 5:
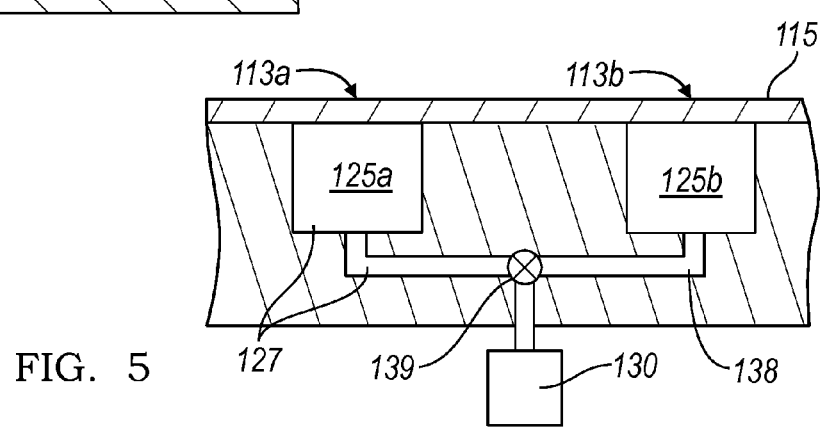
FIG. 5 is a cross sectional view of a variation of the tactile interface layer with a valve.
Figure 10A:
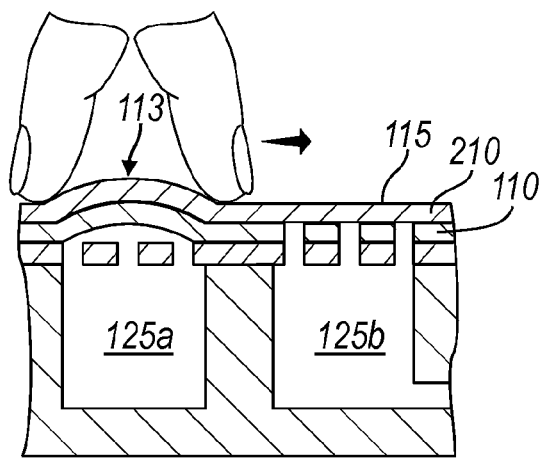
Figure 10B:
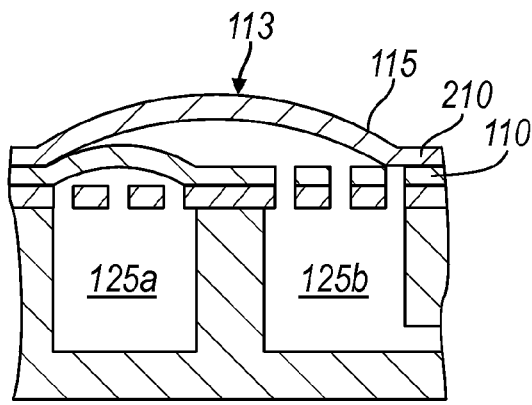

The method S100 of the preferred embodiments is preferably applied to any suitable tactile interface layer that includes deformable regions. In particular, as shown in FIGS. 2-4, the method S100 of the preferred embodiments may be applied to the user interface system as described in U.S. application Ser. Nos. 11/969,848, 12/319,334, and 12/497, 622. The tactile interface layer may be applied over a display, but may alternatively be applied on to a surface without a display. However, the tactile interface layer may be applied to any suitable surface of a device that may benefit from a tactile interface. The tactile interface layer 100 of this variation preferably includes a layer 110 that defines a surface 115, a substrate 120 that at least partially defines a fluid vessel 127 that includes a volume of fluid 112, and a displacement device 130 coupled to the fluid vessel 127 that manipulates the volume of fluid 112 to expand and/or contract at least a portion of the fluid vessel 127, thereby deforming a particular region 113 of the surface 115. The substrate 120 may also include a support region that substantially prevents inward deformation of the layer 110 (for example, inward deformation into the fluid vessel 127). The tactile interface layer 100 of this variation may also include a second layer 210 (as shown in FIGS. 10a and 10b) that allows for an additional degree of deformation of the surface 115. In this variation of the tactile interface layer 100, the step of manipulating the deformable region of the surface based on the command Step S130 preferably includes manipulating the fluid within the fluid vessel 127. In particular, the displacement device 130 is preferably actuated to manipulate the fluid within the fluid vessel 127 to deform a particular region 113 of the surface. The fluid vessel 127 preferably includes a cavity 125 and the displacement device 130 preferably influences the volume of fluid 112 within the cavity 125 to expand and retract the cavity 125. The fluid vessel 127 may alternatively be a channel 138 or a combination of a channel 138 and a cavity 125, as shown in FIG. 3b. The fluid vessel 127 may also include a second cavity 125b in addition to a first cavity 125a. When the second cavity 125b is expanded, a second particular region 113b on the surface 115 is preferably deformed. The displacement device 130 preferably influences the volume of fluid 112 within the second cavity 125b independently of the first cavity 125a. As shown in FIG. 5, the tactile interface layer of this variation may include a valve 139 that functions to direct fluid within the tactile interface layer 100. In this variation, the step of manipulating the fluid within the fluid vessel 127 may include actuating the valve 139 to direct fluid within the tactile interface layer 100. Alternatively, the user interface enhancement system 100 may include a second displacement device 130 that functions to influence the volume of fluid 112 within the second cavity 125b to expand and retract the second cavity 125b, thereby deforming a second particular region 113b of the surface. The second cavity 125b is preferably similar or identical to the cavity 125, but may alternatively be any other suitable kind of cavity. The following examples may be described as expanding a fluid vessel 127 that includes a cavity 125 and a channel 138, but the fluid vessel 127 may be any other suitable combination of combination of cavity 125 and/or channel 138. However, any other suitable type of tactile interface layer 100 may be used.

The tactile interface layer 100 preferably functions to provide tactile guidance to a user when using a device that the tactile interface layer 100 is applied to. As shown in FIG. 4, the surface 115 of the tactile interface layer 100 preferably remains flat until tactile guidance is to be provided to the user at the location of the particular region 113. In the variation of the tactile interface layer 100 as described above, the displacement device 130 then preferably expands the cavity 125 (or any other suitable portion of the fluid vessel 127) to expand the particular region 113 outward, forming a deformation that may be felt by a user (referenced throughout this document as a "tactilely distinguishable formation"), and providing tactile guidance for the user. The expanded particular region 113 preferably also provides tactile feedback to the user when he or she applies force onto the particular region 113 to provide input. This tactile feedback may be the result of Newton's third law, whenever a first body (the user's finger) exerts a force on a second body (the surface 115), the second body exerts an equal and opposite force on the first body, or, in other words, a passive tactile response. Alternatively, the displacement device 130 may retract the cavity 125 to deform the particular region 113 inward. However, any other suitable method of deforming a particular region 113 of the tactile interface layer 100 may be used.

The tactile interface layer 100 preferably includes a sensor that functions to detect the gesture of the user, for example, a capacitive sensor that functions to detect the motion of a finger of the user from the first location to the second location. Alternatively, in the variation of the tactile interface layer 100 as described above, a pressure sensor located within the fluid vessel 127 may be used to detect changes in pressure within the fluid vessel 127 to detect the motion of a finger of the user from the first location to the second location. Alternatively, the sensor may be a sensor included in the device to which the tactile interface layer 100 is applied to, for example, the device may include a touch sensitive display onto which the tactile interface layer 100 is overlaid. The gesture of the user may be detected using the sensing capabilities of the touch sensitive display. However, any other suitable gesture detection may be used.

Similarly, the tactile interface layer 100 preferably includes a processor that functions to interpret the detected gesture as a command. The processor preferably functions to discern between a gesture that is provided by the user to be a command a gesture that may be provided by the user but not meant to be a command, for example, an accidental brush of the finger along the surface of the tactile interface layer 100. The processor may include a storage device that functions to store a plurality of gesture and command associations and/or user preferences for interpretations of gestures as commands. The processor may be any suitable type of processor and the storage device may be any suitable type of storage device, for example, a flash memory device, a hard-drive, or any other suitable type. The processor and/or storage device may alternatively be a processor and/or storage device included into the device that the tactile interface layer 100 is applied to. However, any other suitable arrangement of the processor and/or storage device may be used.

Figure 6:
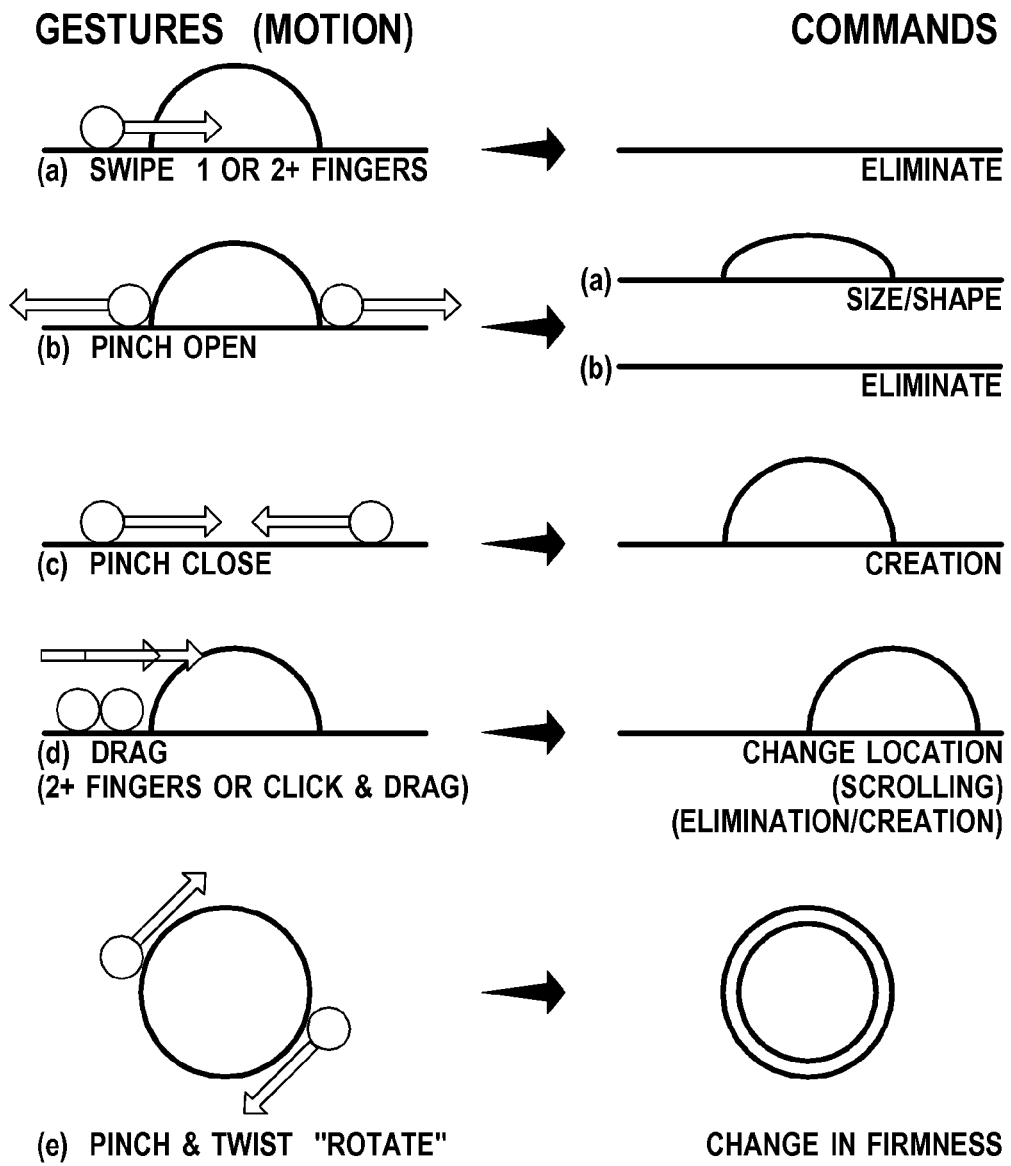
FIG. 6 is a schematic representation of a variety of gestures and exemplary interpretations as commands.

As shown in FIG. 6, a gesture may be one of a variety of movements of one or more fingers of the user across the surface 115 of the tactile interface layer 100. The gesture may be detected as a swipe from a first location to a second location arranged in any suitable location along the surface 115 of the tactile interface layer 100. Alternatively, this first variation of gesture may be detected as a swipe from a first location relative to a deformed particular region 113 to a second location relative to the deformed particular region 113. Detection of a gesture relative to a deformed particular region 113 may be particularly useful in the variation of the tactile interface layer 100 that includes a plurality of deformable regions and may function to allow the interpretation of the gesture as a command for a particular deformable region that is substantially proximal to the detected gesture. However, the gesture may be detected relative to any other suitable portion of the tactile interface layer.

The gesture may be a single finger moving from the first location to the second location on the surface 115, as shown in FIG. 6 (Example A). Alternatively, the gesture may include more than one finger, for example, two fingers, where the first finger moves from a first location to a second location and the second finger moves from a third location to a forth location, as shown in FIG. 6 (Examples B-E). In the variation where the gesture includes more than one finger, the fingers of the user preferably move substantially concurrently. Alternatively, the fingers may move one after the other, or in other words, a "staggered" gesture, for example, a first finger moves and then the second finger moves or the first finger starts moving and continues moving as the second finger starts to move. However, any other suitable temporal relationship between the fingers of the user during a gesture may be used.

In a first variation of the gesture, as shown in Example A, the finger or fingers of a user move from a first location to a second location in a "swiping" motion. In a second variation, at least two of the fingers of the user move apart from each other in a "pinch open" motion, as shown in Example B. In other words, a first finger moves from a first location to a second and a second finger moves from a third location to a fourth, where the second and fourth locations are farther apart from each other than the first and third. A third variation of the gesture may be thought of as opposite that of the second variation, where at least two of the fingers of the user move together in a "pinch close" motion, as shown in Example C. In a fourth variation of the gesture, at least two fingers of the user may move in substantially the same direction in a "drag" motion, as shown in Example D. In other words, a first finger moves from a first location to a second and a second finger moves from a third location substantially adjacent to the first location to a fourth location substantially adjacent to the second location. In this variation, the first and second fingers remain substantially equidistant from the beginning of the gesture to the end of the gesture. In a fifth variation, as shown in Example E, the first and second fingers also remain substantially equidistant from the beginning of the gesture to the end of the gesture. In this fifth variation, the first finger moves from a first location to a second location and the second finger moves from a third to a fourth location along the surface by rotating about a point that is substantially in between the distance between the first and third locations. In other words, the fingers of a user rotate about a center that is substantially defined by the distance between the initial positions of the first and second fingers of the user. While the gesture is preferably one of the variations as described above, the gesture may be any other suitable combination of the above variations and/or any other suitable type of gesture.

As shown in FIG. 6, the gesture may be interpreted as one of a variety of commands for the deformable particular region 113. Examples A-E show exemplary parings between a gesture and the interpreted command. However, any other suitable type of association between gesture and command may be used. In a first variation, the command may be to un-deform (or "eliminate") the deformed particular region 113, as shown in FIG. 6 (Examples A and B). In a second variation, the command may be to change the shape of the deformed particular region, as shown in FIG. 6 (Example B), for example, to enlarge the surface area of the deformed particular region and/or to change overall shape of the deformed particular region (e.g., from a substantially round button to a substantially square button). In a third variation, the command may be to actuate (or "create") the deformed particular region 113. This may be thought of as the opposite of the first variation of command. In a fourth variation, the command may be to change the location of a deformed particular region 113, as shown in FIG. 6 (Example D). In the variation of the tactile interface layer 100 that includes a plurality of deformable regions, the fourth variation may alternatively be thought of the "elimination" of the originally deformed particular region 113 at a first location and the "creation" of another deformed particular region 113 at a second location. The second location is preferably indicated by the gesture provided by the user. However, the location of the deformed particular region may be changed using any other suitable method. In a fifth variation, the command may be to change an already deformed particular region 113, for example, to change the firmness or the height of the deformed particular region 113, as shown in FIG. 6 (Example E). However, any other suitable type of change to the deformed particular region 113 may be used, for example, a gesture that is not in contact with the surface 115. In this variation, the sensor that detects the gesture may be a video sensor or a distance sensor that detects the motion of the user that is removed from the surface 115. Similarly, the gesture may include any other suitable body part of the user, for example, a hand, an arm, and/or a foot.

The command interpreted from the gesture along the surface 115 of the tactile interface layer is preferably one of the variations described above, but may alternatively be any suitable combination of the above variations or any other suitable type of command for the deformable region. In addition to a command for the deformable region, the gesture may also be interpreted as a command for the device, for example, when applied to a device that is a mobile phone, music player, or any other suitable device that outputs sound, the command may include a user command to change the volume of the sound output. Similarly, in a device that provides a visual output, the command may include a user command to change the brightness or any other suitable property of the visual output. However, any other suitable command for the device may be used.

Exemplary Interpretations of Gestures as Commands for the Deformable Region

The following include exemplary interpretations of particular gestures as commands for the deformable region and implementation of the command using the variation of the tactile interface layer 100 as described in U.S. application Ser. Nos. 11/969,848, 12/319,334, and 12/497,622.

Figure 7A:
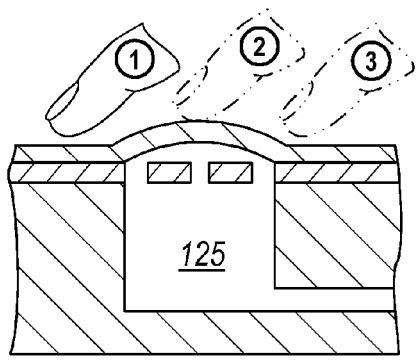
FIGS. 7A and 7B are schematic representations of a swiping gesture and the elimination of a deformed region as applied to the variation of the tactile interface layer in FIGS. 2-4.
Figure 7B:
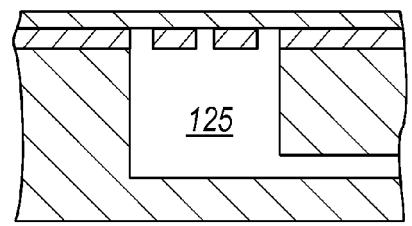

In a first exemplary interpretation, as shown in FIG. 6 (Examples A and B), a "swiping" gesture, as shown in FIGS. 7a and 7b, or a "pinch open" gesture may be interpreted as an "eliminate" command to un-deform the deformed particular region 113. The "swiping" motion and the "pinch open" gesture is substantially similar to a motion a user may make when moving an object away or to push out a crease, thus, it may be useful to associate such a gesture with the elimination of a deformation of the deformed particular region 113. The "swiping" and "pinch open" gesture may involve one and two fingers of the user, respectively, but may alternatively involve two and four fingers of the user, respectively, or any other suitable number of fingers of the user or any other suitable number of fingers of multiple users. In this exemplary interpretation, in the variation of the tactile interface layer 100 that includes a plurality of deformable regions, the location of the gesture relative to a deformed particular region 113 may be used to determine the deformed region that the user wishes to eliminate. For example, as shown in Example A and FIGS. 7a and 7b, the tactile interface layer 100 may detect that the finger of the user passes over a particular deformed particular region 113 and interprets the gesture as a command to eliminate the particular deformation. Alternatively, the tactile interface layer 100 may detect a command motion from the user and be prepared to eliminate a deformed particular region at a location later indicated by the user. For example, the swiping or pinch open gesture may indicate to the tactile interface layer 100 that the user desires to eliminate a particular deformed region. Upon detection of the gesture, the user interface 100 may actuate an operation mode that waits for a user to indicate the desired deformation to eliminate. The user may then indicate the desired location for the desired deformation to eliminate anywhere on the tactile interface layer 100. The location may be substantially adjacent to where the user provided the gesture, but may alternatively be substantially distal from where the user provided the gesture along the surface 115. However, the user may define their desired location using any other suitable method, for example, applying pressure to a particular location on the surface 115. However, any other suitable method to indicate the desired deformed region to eliminate may be used.

Figure 8A:
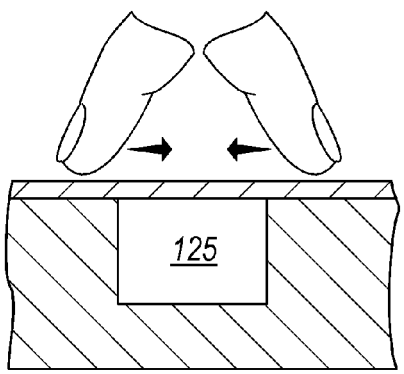
FIGS. 8A and 8B are schematic representations of a pinch open gesture and the creation of a deformed region as applied to the variation of the tactile interface layer in FIGS. 2-4.
Figure 8B:
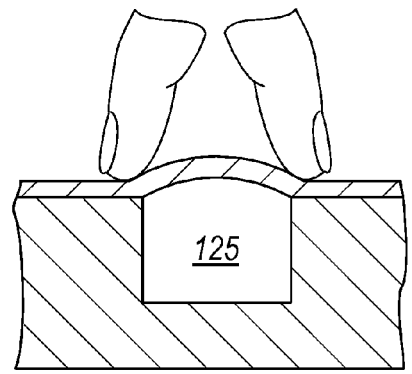

In a second exemplary interpretation, as shown in FIG. 6 (Example C) and in FIGS. 8a and 8b, a "pinch close" gesture may be interpreted as a "creation" command. The user may "create" the button for any suitable reason, for example, to mark a location on a screen, to mark an option, to mark a file for easy reference, or to indicate that tactile guidance is desired at a particular location. For example, as shown in FIGS. 8a and 8b, the user may draw two fingers together to indicate the desired location of a deformed particular region of the surface 113. The tactile interface layer 100 preferably detects the motion of the fingers and location along the fluid vessel 127 and/or cavity 125 corresponding to a particular region 113 that is substantially adjacent to the location substantially central to the location of the fingers as the user draws the fingers is expanded and the desired particular region of the surface 113 is deformed, as shown in FIG. 8b. The user may alternatively draw more than two fingers together to better define a central location. Similar to the first exemplary interpretation, the tactile interface layer 100 may alternatively detect a gesture from the user and be prepared to expand a cavity 125 in a location indicated by the user. For example, the motion of drawing two fingers together may indicate to the tactile interface layer 100 that the user desires expansion of a cavity 125. Upon detection of the gesture, the user interface 100 may actuate an operation mode that waits for a user indication for the desired location for a deformed region of the surface. The user may then indicate the desired location for the deformed region of the surface anywhere on the tactile interface layer 100. The location may be substantially adjacent to where the user draws two fingers together, but may alternatively be substantially distal from where the user draws two fingers together. Alternatively, the user may indicate an arrangement of deformable regions to deform. For example, once a command to deform a particular region is interpreted, the user may indicate the desired arrangement of regions by providing a second gesture, such as to trace a shape on the surface 115 that may indicate, for example, a QWERTY keyboard configuration of deformable regions. The user may also indicate a desired shape of the deformed region of the surface. For example, the user may trace out a desired shape along the surface and the user interface 100 may function to deform the regions substantially adjacent to the traced shape along the surface. However, the user may define their desired location using any other suitable method, for example, applying pressure to a particular location on the surface 115. This variation is preferably used on the variation of the user interface system that includes a plurality of cavities 125 to provide the user with a plurality of options of the location of the deformed particular region of the surface 113, but may alternatively be used on a tactile interface layer 100 with any other suitable number of cavities 125. This may be a useful tactile experience where the device is a trackpad and the user draws his or her fingers together to create a pointing stick, such as the pointing stick trademarked by IBM as the TRACKPOINT and by Synaptics as the TOUCHSTYK (which are both informally known as the "nipple"). This allows a trackpad to be combined with a pointing stick where the two navigational interfaces are generally kept separate.

Figure 9A:
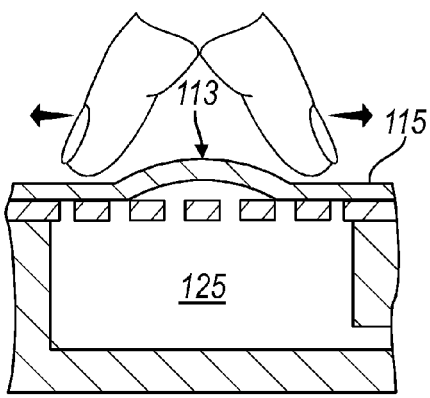
FIGS. 9A, 9B, 10A and 10B are schematic representations of a pinch open gesture and a change of the deformable region in a first and second variation, respectively, as applied to the variation of the tactile interface layer in FIGS. 2-4.
Figure 9B:
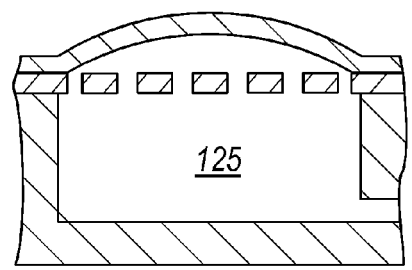

In a third exemplary interpretation, as shown in FIG. 6 (Example B), and FIGS. 9 and 10, the user may pull two fingers in a "pinch open" gesture to indicate the desire to "spread out" a deformed particular region 113, for example, a user may pull two fingers in opposite directions away from a deformed particular region 113 or pull a finger in one direction away from a deformed particular region 113, indicating to the user interface system 100 that the total surface area of the deformation of the particular region 113 is to be increased, or "spread." In a first example, the deformable region of the tactile interface layer 100 may include a first and second degree of deformation, as shown in FIGS. 9a and 9b. In this example, the deformable region may require a first pressure to deform the first degree and a second pressure to deform the second degree; for example, the layer 100 may include a second portion that requires a higher pressure to deform. Alternatively, a first and second cavity 125a and 125b may be coupled to the deformable region such that the expansion of one of the first and second cavities 125a and 125b results in a portion of the deformable region deforming and the expansion of both the first and second cavities 125a and 125b results in the full deformable region deforming, as shown in FIGS. 10a and 10b. Alternatively, the degree of deformation of the particular region 113 may be decreased and substantially adjacent particular regions 113 may be expanded to produce the effect of spreading a deformation across a large surface area. Alternatively, the deformation of the particular region 113 may be maintained and substantially adjacent particular regions 113 can be expanded to substantially the same degree, providing the effect of enlarging a deformed particular region 113. The "spreading" of the deformed particular region 113 may be radially equidistant from the original deformed particular region 113. More specifically, the central point of the resulting deformed particular region 113 is preferably of the same central point of the original deformed particular region 113, as shown in FIG. 9. Alternatively, the central point of the resulting deformed particular region 113 may be different from the central point of the original deformed particular region 113, for example, a user may pull one finger away from the deformed particular region 113 in one direction, indicating expansion of the deformed particular region 113 in the indicated direction, thus moving the central point of the deformed particular region 113 towards the indicated direction, as shown in FIG. 10. Alternatively, the motion of two fingers pulled in opposite directions away from a deformed particular region 113 may indicate to the user interface system 100 to retract the cavity 125 and undeform the deformed particular region 113. However, the user interface system 100 may provide any other suitable active response to the motion of two fingers pulled in opposite directions away from a deformed particular region 113.

Figure 11A:
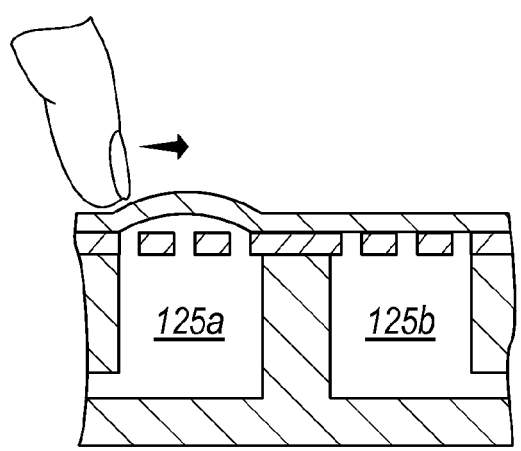
FIGS. 11A and 11B are schematic representations of a drag gesture and a change in location of the deformed region, as applied to the variation of the tactile interface layer in FIGS. 2-4.
Figure 11B:
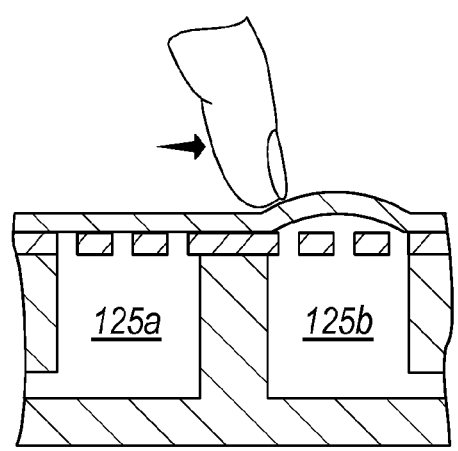

In a fourth exemplary interpretation, as shown in FIG. 6 (Example D), and FIGS. 11a and 11b, a "dragging" gesture may be interpreted as a command to move the deformed region from a first location to a second location along the surface 115. For example, once a first cavity 125 has been expanded and a particular region 113 has been deformed, the user may move his or her finger(s) along the surface 115 (preferably in contact with the surface 115, but may also be any other suitable distance away from the surface 115) to indicate successive particular regions 113 to deform. As a successive particular region 113 deforms, the prior particular region 113 preferably undeforms (in other words, the cavity 125 corresponding to the prior particular region 113 retracts), resulting in the user seemingly "dragging" the deformed particular region 113 along the surface 115. As the user moves his or her finger(s) along the surface 115, the successive particular regions 113 are preferably substantially adjacent or continuous with each prior particular region 113 to provide an experience akin to that of dragging a single object along a surface as opposed to touching a first object on a surface and then another object on the same surface. Alternatively, the deformed region may be "pushed" by the dragging gesture. In this variation, the dragging gesture preferably starts on one side of the deformed region and "pushes" the deformed region forward, as shown in FIGS. 11a and 11b. Subsequent particular regions 113 may be deformed forward of the original deformed region (instead of behind as described in the dragging example) to emulate the user pushing the deformed region from a first location to a second location along the surface 115. Yet alternatively, the user may indicate the deformed region that is to be moved by the start of the "dragging" gesture and then indicate the desired location of the moved deformed region by the end of the "dragging" gesture (in other words, where the user lifts the fingers off the surface 115 after the gesture). In this variation, the initial deformed particular region may be "eliminated" and a particular region at the desired location is "created" while deformable regions in between the eliminated and created deformations are not actuated. However, any other suitable actuation of deformable regions may be used.

In another aspect of the fourth exemplary interpretation, the user may dictate interaction between expanded cavities 125. For example, in the "dragging" example mentioned above, the user may "drag" an object along a path and particular regions 113 are expanded along the path. When an object is dragged over an existing deformed particular region 113, the object and the existing deformed particular region 113 may "react" based on actions of the user. For example, if the user pauses the dragging motion when the object is in the location of the existing deformed particular region 113, the deformed particular region 113 of the object and the existing deformed particular region 113 may seemingly "merge," for example, the total surface area of the existing deformed particular region 113 may grow as if the deformed particular region 113 of the object is added into the existing deformed particular region 113, similar to the third exemplary interpretation. The user may then also drag the "merged" particular region 113 to a different location. Alternatively, the existing deformed particular region 113 and the deformed particular region 113 for the object may "repel" each other, for example, the object may represent a baseball bat and the existing deformed particular region 113 may represent a ball, and the user may "hit" the ball with the baseball bat, seemingly "repelling" the two deformed particular regions. Similarly, the user may perform a splitting motion on an existing deformed particular region 113 and the existing deformed particular region 113 may "split," forming two distinct deformed particular regions 113. Each of the resulting two distinct deformed particular regions 113 is preferably of a smaller surface area than the original existing deformed particular region 113. An example of a splitting motion may be drawing two fingers apart substantially adjacent to the existing deformed particular region 113, However, any other suitable interaction between expanded cavities 125 may be implemented. While an active response to a command given by the user is preferably one of the examples described here, any active response to a command given by the user may be used.

A fifth exemplary interpretation, as shown in FIG. 6 (Example E), a rotating gesture may be interpreted as a command to change the characteristics of a deformed particular region 113 substantially proximal to the user input. Unlike the first, second, third, and fourth exemplary interpretations where the deformations have binary states of expanded and retracted, the command of the fifth exemplary interpretation allows for a plurality of states in between fully deformed and fully undeformed, respectively. For example, the rotating gesture around a deformed particular region 113 may be interpreted as a command to increase the stiffness of the deformation. This may be particular useful in a scenario where the command includes a command for the volume of the device and the deformed particular region 113 indicates the location of the "increase volume" button. When the user provides the rotating gesture around the button to indicate an input to increase the volume, the deformed particular region 113 may become progressively stiffer to the touch as the volume becomes higher and reaches the limit of the volume strength, indicating to the user through tactile means where along the volume scale they are currently. The rate of stiffness increase may be selected by the user to be tailored to their tactile preferences and/or sensitivity. The height of the deformed particular region 113 may also be adjusted as the volume level changes. To adjust the stiffness of the particular region of the surface 113, the displacement device 130 may adjust the amount of fluid that is displaced to expand the cavity 125. The more fluid that is displaced to expand the cavity 125, the stiffer the particular region 113 will feel to the touch. Similarly, the more fluid that is displaced to expand the cavity 125, the taller the deformation of the particular region 113. The user interface system 100 may also include a valve that directs the fluid displaced by the displacement device 130. In this variation, when additional fluid is desired to expand the cavity 125 to increase the stiffness and/or the height of the deformed particular region 113, the valve may direct additional fluid into the cavity 125.

While the interpretation of the gesture as a command is preferably one of the variations described above, the active response may alternatively be a combination of the variations described above or any other suitable combination of gestures and commands.

As a person skilled in the art will recognize from the previous detailed description and from the figures and claims, modifications and changes can be made to the preferred embodiments of the invention without departing from the scope of this invention defined in the following claims.

We claim:

1. A method for actuating a dynamic tactile interface comprising a tactile layer and a substrate, the tactile layer defining a tactile surface, a deformable region cooperating with the substrate to define a cavity, and a peripheral region adjacent the deformable region and coupled to the substrate opposite the tactile surface, the method comprising:

during a period of time, detecting a first progression of a first input object from proximate a first location over the substrate to proximate a second location over the substrate;

during the period of time, detecting a second progression of a second input object from proximate a third location over the substrate to proximate a fourth location over the substrate, the first location and the third location spanning the deformable region, and the second location and the fourth location spanning the deformable region;

interpreting the first progression and the second progression as a gesture; and in response to the gesture, displacing fluid into the cavity to transition the deformable region from a retracted setting into an expanded setting, the tactile surface at the deformable region offset above the tactile surface at the peripheral region in the expanded setting.

2. The method of claim 1, wherein detecting the first progression comprises detecting contact of the first input object on the tactile surface between the first location and the second location.

3. The method of claim 1 wherein detecting the first progression comprises detecting a change in capacitance proximate the first location at a first instance during the period of time and detecting a change in capacitance proximate the second location at a second instance during the period of time and subsequent the first time.

4. The method of claim 1, wherein displacing fluid into the cavity to transition the deformable region from the retracted setting into the expanded setting comprises displacing a volume of fluid into the cavity, the volume of fluid corresponding approximately to a distance between the first location and the second location.

5. The method of claim 4, wherein displacing fluid into the cavity comprises activating a displacement device to pump fluid from a reservoir into the cavity via a fluid channel defined within the substrate.

6. The method of claim 1, wherein displacing fluid into the cavity comprises transitioning the tactile surface at the deformable region from substantially flush with the tactile surface at the peripheral region to a formation elevated above and tactilely distinguishable from the tactile surface at the peripheral region.

7. The method of claim 1, further comprising
during a second period of time succeeding the period of time, detecting a third progression of an input object from proximate a fifth location over the substrate to proximate a sixth location over the substrate,
during the second period of time, detecting a fourth progression of an input object from proximate a seventh location over the substrate to proximate an eighth location over the substrate substantially simultaneously with the third progression, the fifth location and the seventh location at approximately a first distance from the deformable region, and the sixth location and the eighth location at approximately a second distance from the deformable region less than the first distance,
interpreting the third progression and the fourth progression as a second gesture, and
in response to the second gesture, displacing fluid out of the cavity to retract the deformable region from the expanded setting.

8. The method of claim 7, wherein displacing fluid into the cavity comprises displacing a first volume of fluid into the cavity, and wherein displacing fluid out of the cavity comprises displacing a second volume of fluid out of the cavity, the second volume less than the first volume and corresponding approximately to a distance between the fifth location and the sixth location.

9. The method of claim 1, wherein displacing fluid into the cavity comprises responding to the gesture according to a user preference for an output of the dynamic tactile interface corresponding to the gesture.

10. The method of claim 1, further comprising interpreting the gesture as a selection for a function of a computing device coupled to the dynamic tactile interface, and wherein displacing fluid into the cavity comprises transitioning the deformable region into a tactile formation corresponding to a current state of the function of the computing device.

11. The method of claim 10, wherein interpreting the gesture as the selection for the function of the device comprises interpreting the gesture as a selection from the group consisting of: volume, brightness, and track number.

12. The method of claim 1, further comprising, on a display coupled to the substrate opposite the tactile layer, displaying an image of an input key substantially aligned with the deformable region.

13. The method of claim 12, further comprising, in response to displacing fluid into the cavity, adjusting a rendered size the image of the input key.

14. The method of claim 1, wherein detecting the first progression comprises detecting progression of the first input object from proximate the first location over the substrate toward the deformable region, and wherein detecting the second progression comprises detecting progression of the second input object from proximate the third location over the substrate toward the deformable region, and wherein displacing fluid into the cavity comprises inflating the cavity to expand the deformable region proportional to a distance between the first location and the deformable region and between a distance between the third location and the deformable region.

15. The method of claim 1, wherein detecting the first progression comprises detecting substantially arcuate progression of the first input object from proximate the first location to proximate the second location approximately about a first point on the dynamic tactile interface coincident with the deformable region, wherein detecting the second progression comprises detecting substantially arcuate progression of the second input object from proximate the third location to proximate the fourth location approximately about a second point on the dynamic tactile interface coincident with the deformable region, wherein interpreting the first progression and the second progression as the gesture comprises pairing the first progression and the second progression according to a proximity of the first point and the second point, and wherein displacing fluid into the cavity comprises selecting the deformable region based on coincidence of the first point and the second point on the deformable region.

16. The method of claim 15, wherein identifying the gesture comprises detecting the first progression and the second progression that apply a torque to the deformable region in the expanded setting.

17. A method for actuating a dynamic tactile interface comprising a tactile layer and a substrate, the tactile layer defining a tactile surface, a deformable region cooperating with the substrate to define a cavity, and a peripheral region adjacent the deformable region and coupled to the substrate opposite the tactile surface, the method comprising:
displacing fluid into the cavity to transition the deformable region from a retracted setting into an expanded setting, the deformable region offset above and tactilely distinguishable from the peripheral region in the expanded setting;
during a period of time, detecting a first progression of a first input object from proximate a first location over the substrate to proximate a second location over the substrate;
during the period of time, detecting a second progression of a second input object from proximate a third location over the substrate to proximate a fourth location over the substrate, the first location and the third location spanning the deformable region, and the second location and the fourth location spanning the deformable region;
interpreting the first progression and the second progression as a gesture; and
in response to the gesture, displacing fluid out of the cavity to retract the deformable region.

18. The method of claim 17, wherein displacing fluid into the cavity comprises displacing a first volume of fluid into the cavity to transition the deformable region from the retracted setting into the expanded setting, the deformable region flush with the peripheral region in the retracted setting, and wherein displacing fluid out of the cavity comprises displacing a second volume of fluid out of the cavity, the second volume of fluid less than the first volume of fluid and corresponding approximately to a distance between the first location and the second location.

19. The method of claim 17, wherein displacing fluid out of the cavity comprises adjusting a stiffness of the deformable region by reducing a fluid pressure within the cavity based on the gesture.

20. A method for actuating a dynamic tactile interface comprising a tactile layer and a substrate, the tactile layer defining a tactile surface, a deformable region, and a peripheral region adjacent the deformable region and coupled to the substrate opposite the tactile surface, the method comprising:
during a period of time, detecting a first progression of a first input object from proximate a first location over the substrate to proximate a second location over the substrate;
during the period of time, detecting a second progression of a second input object from proximate a third location over the substrate to proximate a fourth location over the substrate, the first location and the third location spanning the deformable region, and the second location and the fourth location spanning the deformable region;
interpreting the first progression and the second progression as a gesture; and
in response to the gesture, transitioning the deformable region from a retracted setting into an expanded setting, the tactile surface at the deformable region flush with the peripheral region in the retracted setting and offset above the tactile surface at the peripheral region in the expanded setting.

21. The method of claim 20, wherein detecting the first progression comprises detecting substantially linear progression of the first input object from proximate the first location to proximate the second location, and wherein detecting the second progression comprises detecting substantially linear progression of the second input object from proximate the third location to proximate the fourth location substantially simultaneously with the first progression, the first location and the third location at approximately a first distance from the deformable region, and the third location and the fourth location at approximately a second distance from the deformable region greater than the first distance.

22. The method of claim 20, wherein detecting the first progression comprises detecting a change in capacitance proximate the first location at a first instance during the period of time and detecting a change in capacitance proximate the second location at a second instance during the period of time and subsequent the first time.

* * * * *